United States Patent [19]

Anderson

[11] Patent Number: 4,586,888

[45] Date of Patent: May 6, 1986

[54] APPARATUS FOR SHAPING "SOFT" BAKING DOUGH AND THE LIKE BY ROTARY MOLDING APPARATUS

[75] Inventor: Joseph R. Anderson, Ada, Mich.

[73] Assignee: Werner Lehara, Inc., Grand Rapids, Mich.

[21] Appl. No.: 701,547

[22] Filed: Feb. 14, 1985

[51] Int. Cl.[4] ......................... B29C 3/02; A21D 6/00
[52] U.S. Cl. ........................... 425/362; 425/DIG. 230
[58] Field of Search ...... 425/238, 362, 373, DIG. 230

[56] References Cited

U.S. PATENT DOCUMENTS

| 859,999 | 7/1907 | Werner | 425/362 X |
|---|---|---|---|
| 1,964,969 | 7/1934 | Werner | 425/362 |
| 1,971,087 | 8/1934 | Werner | 425/362 |
| 3,302,592 | 2/1967 | Werner | 425/362 X |
| 3,318,264 | 5/1967 | Weidenmiller | 425/DIG. 230 |
| 3,469,540 | 9/1969 | Werner | 425/362 X |
| 4,362,754 | 12/1982 | Wenger et al. | 425/362 X |

*Primary Examiner*—J. Howard Flint, Jr.
*Attorney, Agent, or Firm*—Price, Heneveld, Huizenga & Cooper

[57] ABSTRACT

Rotary molding apparatus particularly for use with "soft"-type baking doughs and like media includes, in combination with a rotary die roll which carries molding cavities in its outer surface, a feed roll for forcibly filling the molding cavities with media from a supply hopper, and media-trapping retention means disposed adjacent the die roll between the feed roll and a take-off conveyor which receives the molded media from the cavities and conveys the shaped media away for further processing. The media-trapping retention means keeps the shaped "soft" media within the molded cavities as the die roll rotates toward the take-off conveyor, and the take-off conveyor preferably is disposed in complementary wrapping engagement with and along at least the lower extremities of the die roll. In its most preferred form the media-trapping retention means includes a shoe with a curved face which is resiliently biased against and in sliding contact with the outer surface of the die roll. The supply hopper and feed roll preferably provide a narrow pressure throat at the location where the molding cavities are filled, as by use of a pressure wall particularly located for this purpose, to ensure complete filling of the molding cavities and also to provide a re-entry channel which facilitates movement of media back into the supply hopper with the rotating surface of the die roll.

51 Claims, 7 Drawing Figures

APPARATUS FOR SHAPING "SOFT" BAKING DOUGH AND THE LIKE BY ROTARY MOLDING APPARATUS

FIELD OF THE INVENTION

This invention relates generally to rotary-type molding apparatus, and more particularly to the use of such apparatus in the baking arts. More particularly still, the invention relates to the use of rotary molding apparatus in conjunction with "soft" baking dough and like material, such as has typically been processed heretofore by other means, for example by use of extrusion techniques or by rolling or otherwise forming the media into a sheet and then cutting specific shapes from the sheet, with attendant waste and surplusage between the various cut-out shapes and processing inefficiencies resulting from the inherent requirement of such procedures for additional handling and positioning operations.

BACKGROUND

In the food-processing industry, and in particular in the commercial baking field, rotary molding apparatus has long been used to process particular types of media, e.g., cookie dough, in connection with which such apparatus is known to work well. However, it is also well-established in the industry that rotary molding devices are inherently limited with respect to the type of media to be processed, e.g., in connection with other types of dough formulation, since troublesome problems are encountered in properly filling the die cavities configured in the outer surface of a cylindrical, rotary die roll, as well as in connection with obtaining suitable "release" of the shaped objects from the cavities in which they receive their shape. As a result, the use of rotary molding devices in the food-processing field has been patterned in accordance with the particular types of media (e.g., baking dough) which are to be processed, even though the rotary apparatus itself actually possesses much greater potential, having the inherent advantage of favorable operating economy resulting from the speed and relative ease with which a continuous succession of shaped products may be produced, together with a high order of reliability and durability.

More particularly, rotary molding devices as used in the baking art are typically used to process comparatively stiff, dry and crumbly dough of the type which when baked produces relatively hard cookies (e.g., "windmill" cookies, "animal" cookies, and the typically round wafers which are often made into cookie "sandwiches" by placing a layer of frosting or confection between a pair of them). The reason for this is that such baking dough lends itself well to being compressed into the configured cavities in the rotary die (i.e., the "die roll"), and even more importantly, lends itself to a "clean", complete release from such cavities subsequent to shaping, which is usually accomplished by means of a coarsely-woven cotton or canvas conveyor belt which is pressed tightly against the surface of the die roll and, thus, against the flat base of the shaped cookies while they are still within the die cavities, and then upon further rotation of the die roll and corresponding further movement of the belt by separating the belt from the die roll at a comparatively wide angle of divergence, whereupon the shaped object adheres to the woven belt and is pulled out of the die roll cavity thereby, the object remaining upon the belt and being conveyed away thereby for further processing. Following such extraction, the emptied cavity then rotates a short distance further with the die roll and is once again refilled, in a continuous operation.

While as a general matter it may be true that a great many different substances have physical characteristics generally similar to those of the stiff baking dough referred to above, and are thus quite suitable for use with known rotary molding techniques, there are nonetheless a very great many other materials or media which are not thought to lend themselves to such processing, and are thus not processed by rotary molding techniques even though the rotary apparatus itself has the potential of providing comparatively great operational economy, ease of maintenance, etc. Within this general grouping of materials not thought to be suitable for rotary molding is the category of baking dough known commercially as "soft" dough, from which softer baked goods are made, in particular the "soft" type of cookies regarded as being more like "homemade" cookies, such as are currently popular in the marketplace. The basic reason for this is the fact that such "soft" dough is considerably more flowable as well as more sticky than the drier, crumbly type of dough conventionally processed by rotary molding, as referred to above; in particular, the "soft" dough will not "pack" in the same sense as conventional cookie doughs and is thus much more difficult to force into the configured die cavities and the like so as to completely fill them, and it is also troublesome to retain within the cavities once placed there due to the more fluid nature of the "soft" dough.

As a result, the "soft" types of baking dough are typically processed, e.g., shaped, by such procedures as sheeting the dough and then cutting the sheet into desired shapes, or for example by extruding the dough through a shaping die whose circumferential configuration defines the desired periphery of the wafer to be formed, a cyclically-operating knife or other cutting device then being used to sever off discrete lengths of the extrusion along a plane perpendicular to the axis of the extrusion. While each such process has certain characteristics and features which distinguish it from the others and which may have some relative advantages, none of these other processes have the potential advantages of rotary molding apparatus from the standpoint of speed, operational simplicity, and economy; however, rotary molding apparatus has not been utilized heretofore in conjunction with such "soft" dough or like media, due to the difficulties referred to above, which heretofore have been thought to be so onerous as to preclude use of rotary molders with such media notwithstanding the gains which might otherwise be achievable.

SUMMARY OF THE INVENTION

The present invention provides new and improved concepts and structures in rotary molding apparatus by which the same may be used with great advantage in connection with the "soft" dough and other such media referred to above.

More particularly, the present invention provides rotary molding apparatus which are especially well-adapted for use with "soft" type dough, and which feature structural configurations and relationships differing significantly from those utilized heretofore in conjunction with known rotary molding devices, by which superior results are obtained with the "soft" type dough in a manner previously thought to be unworkable and, in a practical sense, not possible.

In a general way, the aforementioned structural configurations and relationships provided in accordance with the invention may be summarized as including new and improved die cavity-loading apparatus and techniques, as well as new forms of die roll-following and die cavity-covering apparatus, and new forms of shaped-object release and takeaway apparatus, all cooperatively disposed and combined to provide novel and desirable operational characteristics not heretofore available within the trade.

More particularly stated, the present invention provides new and improved feed roll and related structure for proper loading of the "soft" dough into the die roll cavities, together with novel and unusual die roll-follower slider shoe apparatus for covering the die roll in the critical area between the feed roll and the release/takeaway conveyor apparatus, to effectively seal the completely filled die cavities between the point of filling and the point of removal, and in fact to cooperatively participate during the cavity-filling operation in a manner enabling complete cavity filling and resulting satisfactory shaping of the articles to be produced.

Further attributes and characteristics of the subject matter in accordance with the invention will become more apparent to those skilled in the art following consideration of the ensuing specification which sets forth a particular preferred embodiment of the invention, as illustrated and depicted in the attached drawings, from which it may be appreciated by those in the art that various other embodiments may well be possible.

DESCRIPTION OF PREFERRED EMBODIMENTS

Figure 1:
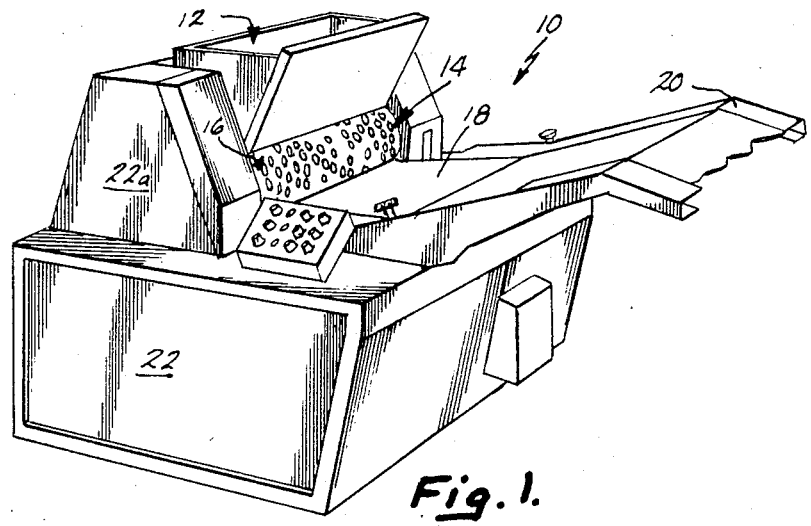
FIG. 1 is a front perspective view showing the general nature of rotary molding apparatus in accordance with the invention.

Referring now in more detail to the drawings, FIG. 1 illustrates the overall nature of rotary molding apparatus 10 in accordance with the invention. In its basic nature, the rotary molder 10 includes a number of elements and attributes which are generally similar or analogous to those of rotary molders which have been used for many years in the baking arts, at least since early versions thereof pioneered by F. C. Werner (as seen, for example, in his U.S. Pat. Nos. 859,999, 1,964,969, 1,971,087, and 3,469,540), who was the founder of applicant's business and the predecessor in interest of the assignee herein. For example, the apparatus 10 includes a supply hopper 12, a rotary cylindrical die 14 (usually called a "die roll") which has a plurality of particularly-configured molding cavities 16 in its outer peripheral surface, a take-off or release conveyor 18 which removes the molded shapes from the die roll 14 and moves them away from the latter, and a processing conveyor 20 which takes the shaped articles from the take-off conveyor belt 18 and moves them onward for further processing, e.g., baking in the case of cookies. The entire apparatus is housed within suitable cabinets and housings 22, 22a, etc.

Figure 2:
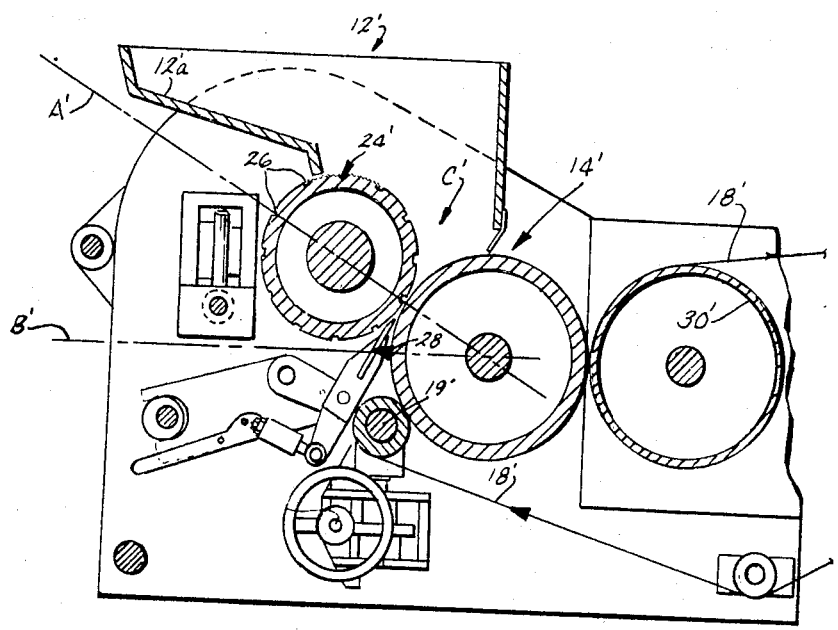
FIG. 2 is an enlarged, fragmentary, sectional side elevation of a portion of a known prior-art rotary molding device which in general typifies conventionally-known rotary molders as used heretofore in the baking art.

Portions of what may be considered a state of the art rotary molder are seen in more detail in FIG. 2 which is taken directly from the aforementioned U.S. Pat. No. 3,469,540 to F. C. Werner. With reference to such figure, it will be seen that the supply hopper 12' includes an internal feed roll 24' which is disposed alongside and at least slightly above the central axis of the die roll 14', with the axis of the feed roll 24' positioned generally in the plane of the rear wall 12'a of the supply hopper, and the die roll 14' positioned generally in alignment with the forward wall 12'b of the supply hopper, although this particular alignment may vary somewhat from one machine to another. Generally, however, the arrangement is such that the baking dough or other media is conveyed or otherwise fed into the top of the supply hopper (also called a feeder hopper at times), and the feed roll 24' and die roll 14' are counter-rotated downwardly to produce a "nip" therebetween. The outer periphery of the feed roll 24' conventionally has a series of parallel, axially-extending grooves 26 therein whose purpose is to provide mechanical gripping force on the dough or other media within the supply hopper, to thereby create a blanket of media coating the outside of the feed roll and rotating with it to the nip between the feed roll and the die roll. When this blanket of dough is rolled against the outside of the die roll, the dough in the blanket is rolled into the molding cavities in the die roll, thereby filling them.

As further indicated in FIG. 2, a clean-off knife 28 (often termed a "doctor knife") is conventionally utilized to ride the surface of the die roll just beyond the point where it leaves the feed roll with the molding cavities filled, thereby "striking" excess material from and contouring the exposed outer surface of the media filling the molding cavities (i.e., the base of the shaped articles), so that the shaped quantities within the cavities are in effect leveled with the adjacent surfaces of the cylindrical die roll. The packed cavities in the die roll then subsequently encounter a take-off conveyor 18', which is usually pressed resiliently against the surface of the die roll by a resilient or other such pressure roller 19'. In this manner the coarsely-woven cotton or canvas take-off conveyor belt 18' is made to tightly engage the base surface of the shaped articles within the die cavities to create adhesion therebetween. This adhesion will overcome that existing between the shaped article and its die cavity at a point further around the periphery of the die roll where the take-off conveyor belt 18' is entrained around an idler roller 30 so as to abruptly separate from the surface of the die roll, with the result that the shaped articles are stripped out of the die roll cavities and travel along with the take-off belt for further processing, e.g., baking. The thus-emptied die cavities then soon re-enter the supply hopper for refilling, in a continuous process which rapidly and efficiently creates a continuous sequence of identically-shaped articles. Of course, the die roll usually has cavities across its entire surface, and thus, the width of the take-off conveyor belt 18' is usually correspondingly filled with the continuous sequence of shaped articles.

Figure 3:
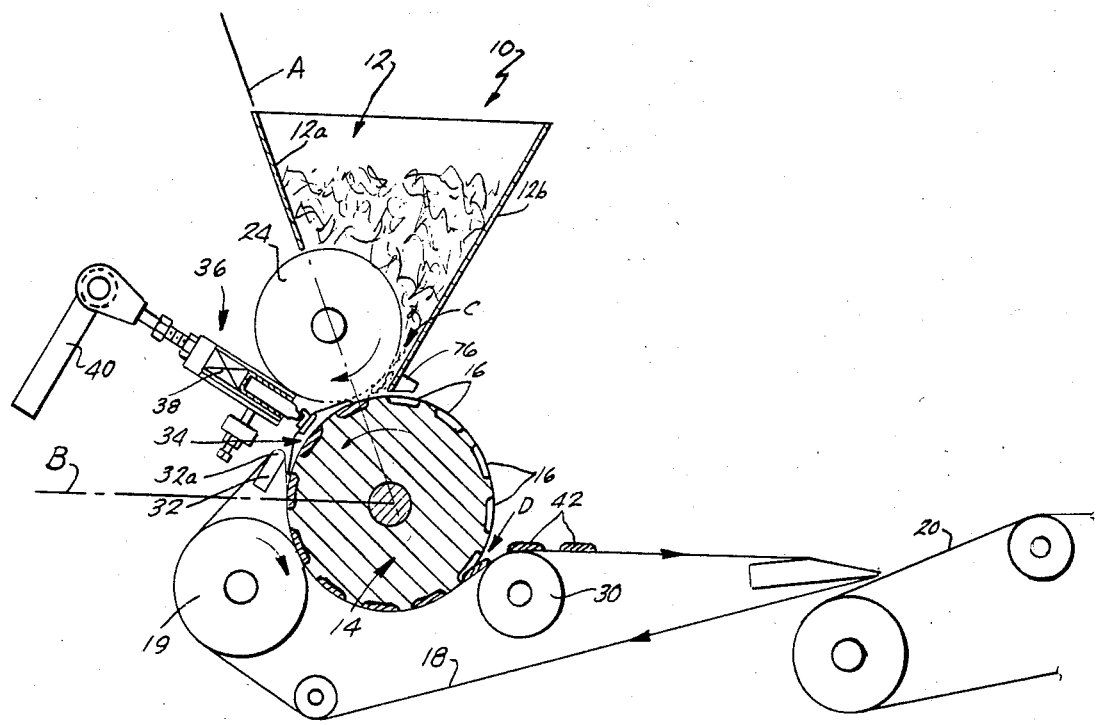
FIG. 3 is an enlarged, fragmentary, sectional side elevation similar to FIG. 2 but showing a portion of rotary molding apparatus in accordance with the present invention.
Figure 4:
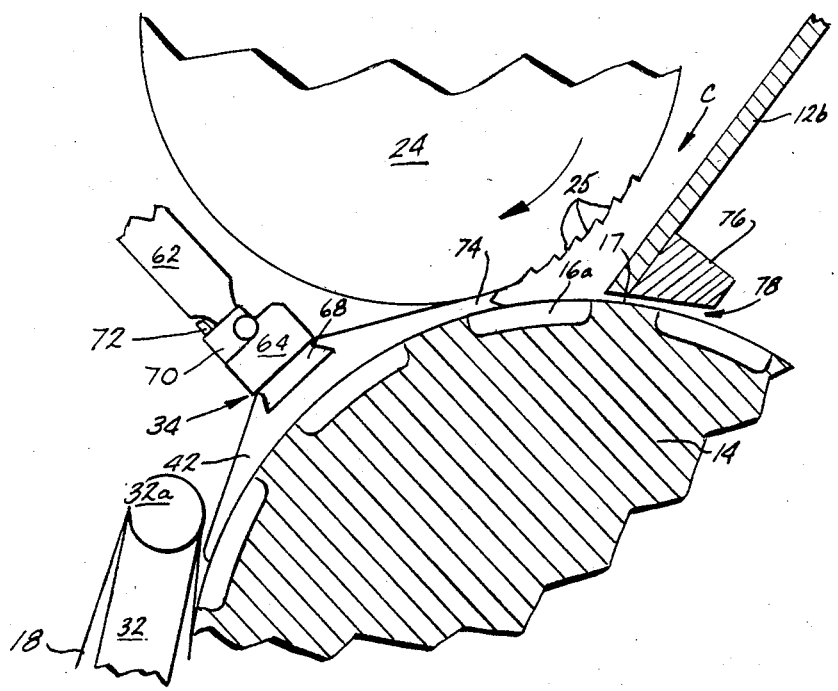
FIG. 4 is a further enlarged, fragmentary side elevational view showing a portion of the apparatus illustrated in FIG. 3.
Figure 6:
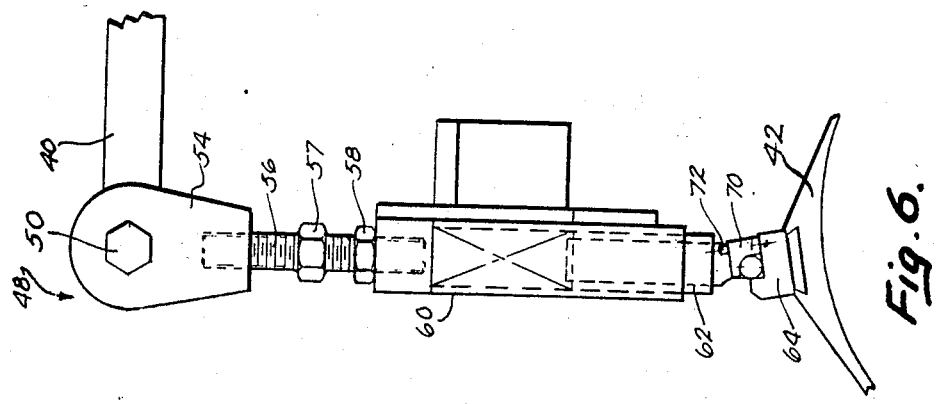
FIG. 6 is a side elevational view of the apparatus shown in FIG. 5.

Differences in structure and structural relationships between those in accordance with the present invention and those characterizing the prior art, as exemplified for example by the apparatus illustrated in FIG. 2, may readily be seen by comparing FIGS. 3 and 4 with FIG. 2. Generally speaking, such a comparison will immediately show that a number of substantial differences exist. More particularly, it will first be noted that the relative positioning of the feed roll 24 with respect to the die roll 14 is considerably different, in that the feed roll is preferably positioned much higher with respect to the die roll, the locus plane A' of FIG. 2 which passes through the axes of both feed roll 24' and die roll 14' describing an angle on the order of about 30 degrees with respect to a horizontal plane B', whereas the comparable locus plane of FIGS. 3 and 4 is substantially more vertical, describing an angle of approximately 75 degrees with respect to the horizontal plane B.

Accordingly, the take-off conveyor 18 of FIGS. 3 and 4 engages the die roll 14 at a substantially higher point than is true of the structure shown in FIG. 2; in fact, in accordance with the apparatus of the invention, the take-off conveyor belt 18 is extended upward a substantial distance along the back of the die roll by the presence of a nose bar 32, which preferably has a roller 32a along its uppermost edge, where the conveyor belt 18 reverses direction and extends downwardly into direct contact with the side of the die roll 14. This relationship entrains the take-off conveyor belt 18 around a substantial portion of the side as well as the bottom of the die roll, in effect "wrapping" the latter throughout this area. In addition, it will be noted that in accordance with the invention, as shown in the preferred embodiment illustrated in FIGS. 3 and 4, the area between the two points on the die roll surface closest to the feed roll 24 and the take-off conveyor belt 18 is bridged by a slider shoe 34, which is held in direct abutting contiguity by a spring-biased loading apparatus 36 which includes a plurality of compression springs 38. The loading apparatus 36 is illustrated in more detail in Fig. 5 and discussed hereinafter; however, it may be noted here that the same preferably includes a quick-release, cam-actuating engagement lever 40. Actually, as will be seen hereinafter, a pair of the release levers 40 are provided, one on each of the two opposite sides of the apparatus.

With continued reference to the structure and relationships pointed out in the preceding paragraph, it should further be noted that the forward wall 12b of the supply hopper 12 is positioned quite differently with respect to the feed roll 24 than is true with respect to the structure characterizing the prior art, as exemplified by FIG. 2. That is, while the particular angularity of the forward wall 12'b in prior art apparatus was subject to considerable variation based upon a number of rather widely-varying reasons (for example, the flow or repose characteristics of the particular media for which the machine might be intended), it has generally been true heretofore that the throat or in feed area C' defined generally between the hopper walls 12'a and 12b and between the feed roll 24' and the die roll 14' was comparatively large, to provide substantial flow capacity. In addition, as pointed out heretofore, the locus plane A' passing through the axes of the feed roll and the die roll was at a lower angle of inclination, thereby placing the point at which the cavities in the rotary die are filled at a considerably lower point along the periphery of the die roll 14'; e.g., in the prior art apparatus depicted in FIG. 2 such point is disposed at approximately the ten o'clock position, but in many other prior art devices it is at a considerably lower point.

As may be seen in FIG. 3, the throat or infeed area C is much narrower in accordance herewith than is true of the prior art apparatus illustrated in FIG. 2, and the loading point of the die cavities is more nearly at the twelve o'clock position, near the top of the die roll. From this point onward in the direction of rotation of the die roll 14, the die roll is substantially completely covered or enclosed in a protective manner, both by the slider shoe apparatus 34 and, along an extensive peripheral segment of the die roll, by the take-off conveyor belt 18, which first contacts the die roll very near to the trailing edge of the slider shoe and continues along contiguous to the surface of the die roll, in effect wrapping the latter, to the release point D, where the shaped articles 42 are stripped out of (e.g., separated from) the die cavities 16 and carried along toward the baking band 20 or other such processing conveyor.

The structure and relative positioning of the members defining throat area C and adjacent, related areas is seen in more detail in FIG. 4, in which one particular die cavity 16a is disposed in alignment with throat area C for filling. Of coarse, the die roll 14 typically includes many such cavities adjacent one another along its length and around its circumference, which may be arranged in various patterns, and one or more of the cavities is thus likely to be in alignment with the throat area at practically any particular instant, just as various of the "land" areas which separate the different die cavities will also be so aligned at any given point in time, the operation of the apparatus being such as to fill whatever die cavities are present in alignment with the throat area at any given point in time.

The complete filling of the die cavity 16a is a matter of considerable difficulty when rotary molding apparatus is attempted to be utilized in conjunction with the aforementioned "soft" baking dough or like media, owing to the considerably more liquid or flowable nature of such media, together with a much greater degree of stickiness, causing a number of problems not present in the rotary molding of more conventional firmer dough formulations. As a result, the "soft" dough does not pack into the die cavities in the same way, does not blanket the feed roll in the same way or to the same extent as a result of feed roll rotation, and has considerably different characteristics in other respects as well. For example, in a conventional rotary molding device the feed roll carries a moderately thick "blanket" of dough around all or most of its outer periphery as it continuously rotates. The presence of this blanket and its comparatively firm consistency is directly involved in the filling of the die cavities, since this allows the dough forming the blanket to be rolled into the die cavities and thus pack them full. When "soft" doughs are attempted to be used in a rotary machine, however, the dough which coats and follows the feed roll is of a considerably different nature, since the dough has increased surface adhesion but at the same time is more liquid and flowable. As a result, it does not form a thick blanket on the feed roll, nor is it "packable" into the die cavities. Instead, the dough must be flowed into the cavities under pressure, but it is difficult or impossible to maintain the required pressure gradients across a conventional throat area such as that designated C', particularly without undue churning and agitation of the dough or media within the throat area, which leads to undesirable aeration, overworking, and other adverse effects which may severely degrade the media.

Figure 7:
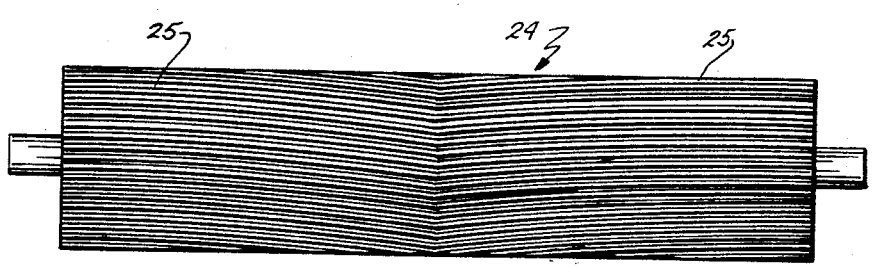
FIG. 7 is a front elevational view showing a preferred form of feed roll in accordance with the invention.

Accordingly, the structure defining the throat area C in FIG. 4 is significantly, if subtly, different from that which has been used in the prior art. In the first place, the surface of the feed roll 24 is preferably configured differently than that of feed roll 24' illustrated in FIG. 2. That is, instead of the straight square or rectangular cross section grooves 26 (FIG. 2) extending along the periphery generally parallel to the axis of the feed roll, a series of adjacent helically-extending grooves 25 (FIGS. 4 and 7) are preferably utilized, which are preferably of a sawtooth cross section. One preferred example of this shape is illustrated in FIG. 4, representative sizing of which is to have each sawtooth groove approximately four-tenths of an inch wide and about one-sixteenth of an inch deep at the leading edge. Such a feed roll configuration in effect grips the adjacent media to a greater extent and changes the pressure gradient within the throat area, giving both greater pressure and a more even distribution or gradient. That is, the helical array of adjacent grooves (with a helical angle preferably on the order of about five degrees, and with oppositely-disposed complementary helical grooves meeting at the center of the feed roll to form a broad V shape) causes much less of a pulsatory pressure characteristic than does the conventional succession of spaced, mutually independent grooves disposed parallel to the axis, each such groove sweeping through the throat during a longer time interval and the leading edge of each successive helical groove entering the throat area before the trailing end of the previous one leaves.

A further and highly significant change in the nature of the throat area C shown in FIGS. 3 and 4 is brought about by the relative positioning of the feed roll 24 and the forward hopper wall 12b. That is, the hopper wall 12b is angularly disposed with respect to the vertical, and has its lowermost portion positioned very close to the periphery of the feed roll 24, i.e., preferably on the order of about one-half inch (as opposed to a distance in the range of from three to as much as six inches in prior art devices). Such an arrangement further affects the pressure gradient within the throat area, and has a principal result of achieving full and complete filling of the die cavities as they rotate through the throat area and pass beneath the slider shoe 34, regardless of the particular position of a given die cavity along the length of the die roller.

More particularly, the problems involved in rotary molding of the "soft" dough or other such media referred to above are very different from the situation prevailing in connection with typical, known rotary molding techniques as conventionally practiced in the baking arts. Thus, in the known use of apparatus as in the aforementioned U.S. Pat. No. 3,469,540, as in others, the comparatively heavy and readily compactible conventional cookie dough may readily be rolled into the confines of each die cavity from a position generally alongside the die roll, to pack and completely fill the cavities in the latter, and it is only necessary to utilize a "doctor knife" immediately following the point of feed roll engagement with the die roll in order to "strike" off excess dough and successfully provide completely filled die cavities which may then be moved by rotation of the die roll to a subsequent point where a resilient snubber roll squeezes the cotton or canvas take-off conveyor belt against the die roll in order to effect release of the shaped articles. In this connection, the shaped articles within the filled die cavities simply adhere in place and are readily moved downwardly to the point where the take-off conveyor engages the die roll.

The situation is quite different where "soft" doughs are concerned, however, for a great many reasons. Principally among these are the fact that this type of media does not form a thick blanket on the feed roll which may simply be rolled into the die cavities, and must instead be forced by pressure into the die cavities. When this is attempted, the media tends to pump directly through and out the other side of the cavities under various pressure conditions, and/or the cavity simply may not fill completely, leaving voids, because the soft, sticky dough will much more readily "extrude" through narrow openings and the like and yet at the same time tends to adhere to surfaces which it encounters as it moves into the die cavities (e.g., the die cavity surfaces themselves, etc.) Additionally, and very significantly, even if the "soft" dough or media is somehow made to fill the die cavities satisfactorily, it will not simply remain in place during continuing rotation of the die roll to its position of engagement with the take-off conveyor and squeeze roll, as is the case in conventional rotary molding procedures. In the first place, use of a conventional doctor knife to clean the surface of the die roll will allow the pressurized soft media to merely escape under the knife as the cavity is being filled. Additionally, attempts to use a knife edge to strike the filled cavity openings will displace some of the soft media out of the cavities and in effect smear it about the surface of the die roll, into various openings and places where it should not be present, thereby causing a double problem. In the second place, the soft dough or media placed in the cavities may simply tend to flow or distort in shape due to gravity, centrifugal force, etc., as the die roll continues to rotate.

The foregoing and other problems are resolved in accordance with the invention by the structure and structural relationships referred to above, commencing with the throat pressurization effects resulting from the relative positioning and relationship of the feed roll 24 with respect to the front hopper wall 12a together with the helically-extending, sawtooth-shaped groove 25 in the feed roll, as well as the additional features now to be described in more detail. With reference to FIGS. 3 and 4, the slider shoe assembly 34 in effect covers a substantial segment of the cylindrical outer surface of die roll 14, commencing from a point near the top of the latter and extending in a counterclockwise direction to a point directly adjacent that where the nose bar 32 brings the take-off or release conveyor belt 18 into its first contact with the surface of the die roll (FIG. 4). As such, the slider shoe assembly 34 in a sense replaces the conventional doctor knife, and such a device per se is not even utilized. Physically, the slider shoe 34 comprises a laterally-elongated, arcuately-faced slider bar 42 (FIG. 4) which is disposed in tight contact with the surface of the die roll 14 and which extends along the surface thereof in an axial direction. Slider bar 42 is forced under the pressure of biasing springs 38 (FIGS. 3 and 5) tightly against the surface of the die roll, as a function of the positioning of the release lever 40 noted previously.

The elongated slider bar 42 is preferably in the form of a series of shorter segments 42a, 42b, 42c, etc., (FIG. 5), each disposed directly adjacent and contiguous to the next and connected to a common support and loading bar 44, such that all of the various slider bar segments together in effect form an elongated, composite unit, but with each segment being self-aligning by moving at least minutely with respect to the others. The support and loading bar 44 is, in turn, coupled to the opposite sides 46a, 46b of the internal supporting frame for the rotary apparatus generally, which frame also rotatably supports the feed roll 24, die roll 14, etc., as by means of conventional trunnion mountings. Mounting of the support and loading bar 44 in this manner is preferably accomplished by a rotary cam or eccentric mount 48, which in essence comprises a central mounting pin 50 in the form of a bolt or the like that fixedly engages the side of the main frame and forms a pivot axle. A cam or eccentric crank, or cam, member 52 is disposed about the pin 50 and located within an outer housing 54 having an appropriately-sized cavity for rotatably receiving the outside periphery of the eccentric member 52. The aforementioned release lever 40 is rigidly connected to the eccentric member 52, such that rotation of the release lever 40 rotates the member 52, and the latter in turn moves the housing 54, and thus the entire support and loading bar 44, to which it is coupled by appropriate externally threaded studs 56 carrying a fixed and relatively movable adjustment nuts 57 and 58.

Figure 5:
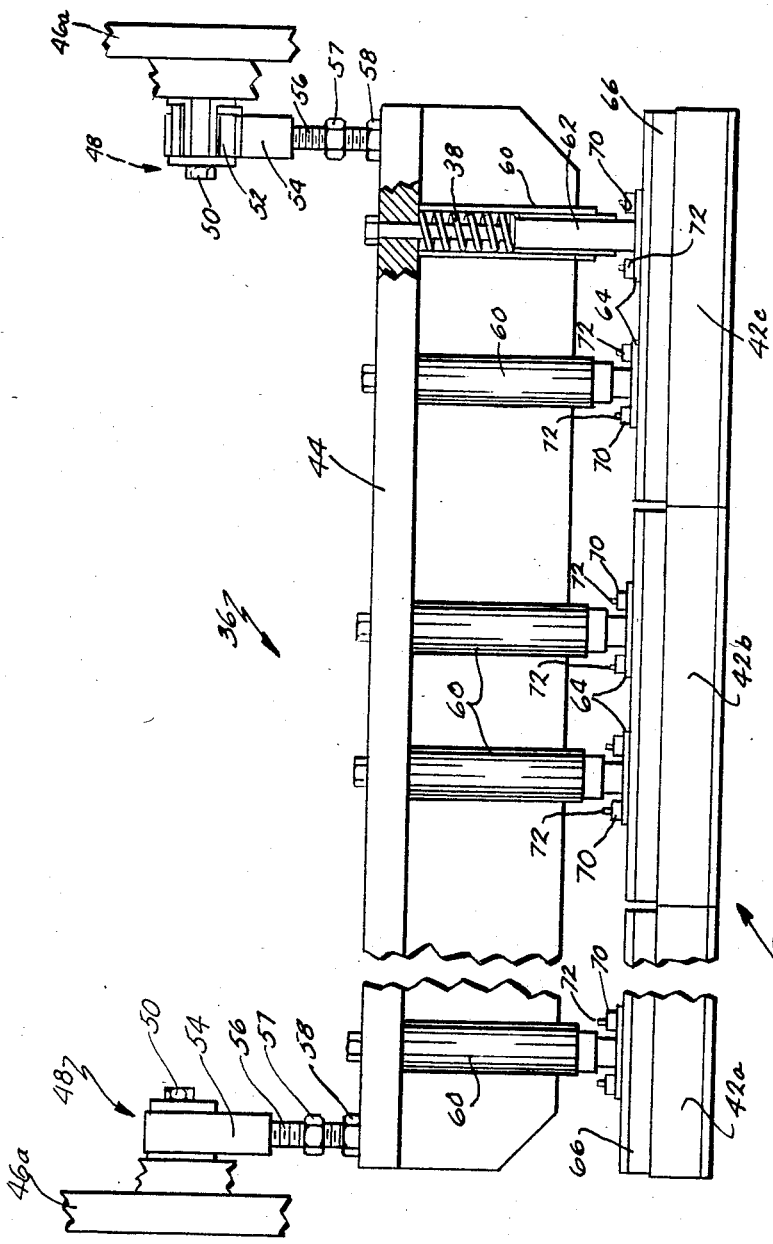
FIG. 5 is an enlarged, front elevational view showing the die roll-following slider shoe apparatus, including spring-biasing loading apparatus therefore.

The connection of the various slider bar segments 42a, 42b, etc., to the support and loading bar 44 is preferably accomplished by the structure illustrated in FIG. 5. Basically, this includes a pair of spring-loaded connectors 45 for each slider bar segment, each such connector comprising a tubular outer shell 60 in which a cylindrical anchor pin 62 is telescopingly slidable, against the opposing force imposed by the springs 38. The cylindrical anchor pin 62 is T-shaped at its lower extremity, having an attachment foot 64 of circular cross section which affords at least a degree of pivotal movement. More particularly, the slider bar 42 has a dovetailed recess in its upper extremity (FIG. 4) which receives a complementary-shaped retainer 68, which may advantageously have a double-tapered or chamfered base as illustrated. A mounting plate 66 of L-shaped cross section is secured atop the dovetailed retainer 68, and the cylindrical-section T-shaped attachment foot 64 is pivotally secured atop mounting plate 66 by a pair of spaced clamps 70 which have an inverted L-shaped cross section so as to fit around the top of the attachment foot and pivotally cage it in place atop the mounting plate 66, each of the clamps 70 having a through bolt 72 by which it is secured in place.

The structure just described mounts the various slider bar segments so that they function together generally as a continuous slider bar, and yet such that each is capable of at least minute movement relative to one another to accurately conform against and slide upon the surface of the die roll 14. At the same time, the arrangement described serves to provide an efficient and readily-actuatable means for exerting substantial spring force against the slider bar segments, in a manner by which such force is applied uniformly across the total effective length of the slider bar and the corresponding length of the die roll, against which such spring force is actually exerted by the various slider bar segments. The amount of this spring force may be varied by adjustment of one of the nuts 57 and 58 relative to the other, to thereby change the effective length of the threaded connector stud 56 on each of the two opposite sides of the support bar 44. The entire loading apparatus 36 is readily actuated into and out of position causing spring-biased engagement of all of the slider bar-segments against the die roll by simply moving the two release levers 40 to one or the other of their end positions, thereby rotating the eccentric members 52 and camming the support bar 44 and all of the various segments of slider bar 42 simultaneously toward or away from the die roll.

As previously indicated, the slider shoe 34 has substantial importance to the proper functioning of the overall rotary molding apparatus. In the first place, the slider shoe covers a sizable arcuate segment of the die roll, and it is desired to have the entire concave face of the slider shoe held in close, intimate contact tightly against the die roll throughout all portions of this area. At the same time, it is desirable not to introduce unnecessary drag upon the die roll by the slider shoe, and to have no disruption of the dough or media within the completely-filled cavities in the surface of the die roll. Additionally, it is found that the nature of the slider shoe, and in particular the configuration of its leading edge, has an important effect upon the complete filling of the die cavities as well as in the removal of dough or media from the rotating surfaces of the feed roll and die roll.

In order to best accomplish these ends, the slider shoe configuration illustrated in FIG. 4 was ultimately determined to be the most preferred embodiment, although other workable embodiments also provide various degrees of success. With reference to the slider shoe structure illustrated in FIG. 4, it will be noted that this component preferably comprises a solid casting or machining generally having a broad V-shaped cross-sectional configuration, defining the aforementioned dovetail recess at the apex of the V. The leading edge of the slider shoe preferably is formed to have the V-notched, double-chisel configuration illustrated at 74 (FIG. 4), while the trailing edge may have a rounded or tapered configuration as illustrated, or it may in some circumstances be feathered-out into a covering edge which extends into and substantially fills whatever area exists between the surface of the take-off conveyor belt 18 and the adjacent surface of the die roll 14, thereby leaving little or no uncovered area on the die roll from the point where the cavities are filled to the point where the shaped media is stripped out of the cavities.

As for the particular structure of the slider shoe segments, potentially useful designs include specifically-machined or cast metal (e.g., steel) surfaced with a sheet of lubricious polymeric material, for example PTFE (sold commercially under the trademark "TEFLON"), which may be bonded to the surface of the metal; another potentially usable configuration is a solid UHMW plastic structure, or various other plastic configurations having spring steel holders or reinforcements in order to improve shape retention and a close-fitting relation to the die roll surface. In general, however, it is preferable to avoid the requirement of a specifically-sized precision-machined slider shoe made expressly for each specific die roll, particularly since the die rolls (which are usually made of brass) are known to abrade or wear slowly during continuous use and thus to experience progressive diameter reduction with time. Plastic surfaces always present the potential of abrasion or tearing, etc., as well as delamination, although they do provide replaceable surfaces whose size and shape may be periodically refined. Generally, however, such surfaces are considerably less wear-resistant, and thus require further and additional maintenance, as well as presenting the potential problem of contamination.

Accordingly, the most preferred version of the slider shoe 34 is to utilize a monolithic metal structure such as that illustrated in FIG. 4 and described above, preferably formed of material which will provide the desired qualities of flexibility and wearability, by which the slider shoe may be made to conform closely and accurately to the curved cylindrical surface of the die roll by being spring-biased against the same under the requisite forces, and yet which will not cause excessive wear, either of the slider shoe itself or of the contiguous die roll. The material ultimately found to be most successful in this regard is the commercial nickel-copper alloy which is commonly known as "nickel-silver" (designation D-8). With such material, the machined concave surface may have a radius slightly smaller than that of the smallest die roll with which it is anticipated to be used, and the spring pressure applied by the loading apparatus 36 will thus resiliently flex the concave surface of the slider shoe outward to a somewhat larger radius at which point it tightly conforms to the surface of the die roll. In such an arrangement, the spring force required is sufficiently high that conventional doctor knife-holding apparatus as used in conventional rotary molding apparatus is not sufficiently strong and solid, thus requiring the specialized loading apparatus 36 described above to insure the desired uniformity and extent of pressure required.

The V-grooved or double-chisel configuration 74 at the slider shoe "strike" point does not result from more happenstance or arbitrary choice. On the contrary, a typical doctor knife has a tapered, sharpened leading edge, but the attempted use of such a configuration in a slider shoe utilized in an environment and for purposes in accordance herewith would result in substantial escape of the soft, flowable dough over the top of the slider shoe, with the rotation of the feed roll, resulting in extensive and unacceptable difficulties. Various other shape configurations (such as blunt-ended, chisel-faced, etc.), produce their own corresponding problems and difficulties; however,the double-chisel or V-grooved configuration illustrated will provide excellent results with respect to "striking" dough from the surface of both the feed roll and the die roll without allowing significant leakage or creeping of dough past the point, while at the same time facilitating the complete filling of die cavities, as noted above.

A further feature of the structure and methodology in accordance with the invention resides in the tapered media return means 76 (FIG. 4) which is disposed along the bottom edge of the front wall 12b of the feed hopper. As a result of a number of factors such as the feed pressure existing at the base of the throat C and conditions imposed upon the media attendant the filling of the various die cavities 16 as they are moved by the feed roll into filling position, together with the cooperative action of the slider shoe 34, take-off conveyor 18, etc., there may be a small continuing amount of dough or other media at the base of the front wall 12b outside the feed hopper which should desirably be moved back into the throat area C within the hopper upon corresponding rotation of the die roll 14. It has been found, however, that this media will not otherwise reenter the hopper at this position due to the pressure existing within the throat along with the other conditions already noted. Without other measures to resolve this difficulty, a continuing and steadily-increasing amount of dough or media would thus build up at the bottom of front wall 12b during lengthy operation of the apparatus such as typically occurs. It has been found that the use of the tapered return, or reintroduction, apparatus 76 will resolve this problem by inducing the reentry of dough under the lower edge of the front wall 12b and back into the throat area C.

Basically, the return apparatus 76 comprises a generally rigid, somewhat wedge-shaped strip (e.g., of steel) which defines a converging return passage 78 between its lowermost surface and the adjacent cylindrical surface of the die roll. This converging reentry passage has the tendency of inducing media reentry, as a result (it is thought) of its effects in gradually and continuously spreading out and compacting the dough or media brought to the leading edge of the member 76 by the continuous rotation of the die roll 14. Upon initial start-up of the apparatus and the progression of the apparatus and media into steady-state operation, the media entering the reentry channel 78 from outside the front of wall 12b continues in a smooth and desirable manner, without buildup of media at the entrance to channel 78, with newly-arriving media brought by rotation of die roll 14 seemingly being pulled into the channel, perhaps by the cohesiveness and surface tension characteristics of the media, under the influence of the reentry member 76, notwithstanding the comparatively high pressure within the throat area C.

From the foregoing, it will be seen that the present invention extends the useful scope of rotary molding apparatus substantially beyond the point previously recognized and in effect, opens a new area in which the benefits of such apparatus may be obtained. In so doing, the invention capitalizes upon structural attributes known heretofore, and modifies, changes, and adds to the structures and characteristics previously known. In so doing, the invention provides a form of rotary molding apparatus which only superficially resembles that previously known, and which in a more particular sense is not only structured differently at the most characteristic points but in addition has operational characteristics which also are fundamentally different in the most significant ways. Thus, the apparatus in accordance with the invention employs different principles in order to bring about complete filling of the die cavities, as well as different principles in effectively sealing the cavities once they are completely filled, thereby preventing disruption or removal of the "soft" dough/media between that time and the time the same is stripped out of the cavities. Additionally, the invention provides a new approach in effecting reentry of surplus or extraneous dough/media back into the feed hopper from the point outside the same where the continuous rotation of the die roll ultimately brings such dough/media. Upon considering the foregiong disclosure of preferred embodiments, and of the underlying concepts revealed thereby, persons skilled in the art will no doubt realize that the invention is subject to implementation in various particular ways, utilizing particular concepts of the invention in various ways and in various combinations which may employ all or less than all of the total thereof. Accordingly, the invention is to be construed in accordance with the scope of the appended claims and as the terms of the same may permit, due regard being had for the substance of the invention and the latitude and breadth reasonably supported by the actual terminology employed, under established principles of patent law including the Doctrine of Equivalents.

The embodiments of the invention in which an exclusive property or privilege is claimed are defined as follows:

1. Rotary molding apparatus for producing a continuing sequence of shaped articles from "soft"-type baking doughs and like media, comprising in combination: a generally cylindrical rotary die roll having a plurality of molding cavities in its outer surface and a longitudinal axis of rotation; a supply hopper disposed generally above said die roll axis, for holding a quantity of "soft"-type media to be molded; a rotary feed roll communicating with the media in said hopper for feeding such media from the hopper to said die roll for shaping by the said cavities thereof; a take-off conveyor having a belt with a portion extending into complementary wrapping engagement with and along at least the lower extremities of said die roll, for receiving the shaped articles of soft media from the die roll cavities in which they are shaped and conveying the shaped articles away for further processing; and article-trapping retention means disposed adjacent an arcuate segment of the surface of said die roll located near and extending away from said feed roll in the direction of die roll rotation, for trapping the shaped media and retaining same in place within individual molding cavities of said die roll during rotation of the die roll by which such cavities are moved from the comparatively higher position near the feed roll to a lower position of the die roll nearer the point where said take-off conveyor receives the shaped media from the die roll molding cavities.

2. Rotary molding apparatus as defined in claim 1, wherein said article-trapping retention means includes a laterally-elongated shoe member having a curved face disposed adjacent said die roll to arcuately cover a portion of its surface.

3. Rotary molding apparatus as defined in claim 2, wherein said shoe member includes an arcuately-shaped face disposed in complementary continguous sliding contact with said die roll throughout at least a portion of said arcuate segment thereof.

4. Rotary molding apparatus as defined in claim 3, and including loading means for forcing said arcuate shoe face against the surface of said die roll under pressure.

5. Rotary molding apparatus as defined in claim 4, wherein said loading means includes resilient biasing means for forcing said shoe face against the surface of said die roll under pressure.

6. Rotary molding apparatus as defined in claim 5, wherein said loading means includes force-generating leverage means for loading said resilient biasing means against said shoe member to force its arcuate face against the die roll under pressure.

7. Rotary molding apparatus as defined in claim 3, wherein said shoe member has a leading portion which extends along the surface of said die roll toward said feed roll and defines a leading end which is disposed generally between said feed roll and said die roll.

8. Rotary molding apparatus as defined in claim 7, wherein said leading end of said shoe member substantially fills the spacing between said feed roll and said die roll at least near the position where the surfaces of such two rolls most closely approach one another.

9. Rotary molding apparatus as defined in claim 8, wherein said leading end of said shoe member defines a first edge located adjacent the surface of the die roll and a second edge located adjacent the surface of the feed roll.

10. Rotary molding apparatus as defined in claim 9, wherein said leading end of said shoe member defines a recess between said first and second edges.

11. Rotary molding apparatus as defined in claim 3, wherein said shoe member generally comprises a shaped slider bar of generally monolithic cross section having an integral arcuate face which slidably rides upon said die roll.

12. Rotary molding apparatus as defined in claim 11, wherein said slider bar has an arcuate face of at least slightly smaller curvature radius than that of said die roll and said slider bar has a degree of structural flexibility which is at least sufficient to allow elastic deformation of said arcuate fact to complement the curvature of said die roll, and further including loading means for forcing said slider bar against said die roll with sufficient pressure to cause said complementing elastic deformation of said slider bar.

13. Rotary molding apparatus as defined in claim 12, wherein said loading means includes resilient biasing means for forcing said arcuate shoe face against the surface of said die roll under resilient pressure.

14. Rotary molding apparatus as defined in claim 12, and including means for guiding said take-off conveyor into engagement with the surface of said die roll at a point closely adjacent the trailing end portion of said shoe member, such that the surface of the die roll in which said molding cavities are formed is substantially completely covered at least through the area extending from the leading edge of the shoe member to the point where said take-off conveyor separates from the die roll and removes the shaped articles therefrom.

15. Rotary molding apparatus as defined in claim 14, wherein said substantially covered area of said die roll extends from at least about the eleven o'clock position on the die roll to about the six o'clock position on the die roll.

16. Rotary molding apparatus as defined in claim 15, wherein the axis of rotation of said feed roll is positioned at least slightly higher relative to the circumference of said die roll than is the leading edge of said shoe member.

17. Rotary molding apparatus as defined in claim 15, wherein said take-off conveyor engages said die roll at about the nine o'clock position on the latter.

18. Rotary molding apparatus for producing a continuing sequence of shaped articles from "soft"-type baking doughs and like media, comprising in combination: a generally cylindrical rotary die roll having a longitudinal axis of rotation, said die roll having a plurality of molding cavities in its outer surface; a supply hopper disposed generally above said die roll axis, for holding a quantity of "soft"-type media to be molded within said cavities; a take-off conveyor belt having a portion extending into complementary wrapping engagement with and along at least the lower extremities of said die roll, for receiving the shaped articles of soft media from the die roll cavities in which they are shaped and conveying the received articles away for further processing; means for pressurizing the media to be fed from said hopper to said die roll to thereby cause the pressurized media to flow into and fill the confines of said molding cavities without leaving voids as a result of the fluid pressure imposed on said media; and means for retaining the soft media in place within the individual molding cavities of said die roll as the die roll rotates through an arcuate area located between the filling point of said cavities and the point where said take-off conveyor belt receives the shaped media from the die roll in which they are shaped.

19. Rotary molding apparatus as defined in claim 18, wherein said means for pressurizing said media includes a narrow pressure throat area within said supply hopper having a discharge end located directly adjacent said die roll, and means for applying force to the media within said narrow throat in a direction oriented generally toward said die roll.

20. Rotary molding apparatus as defined in claim 19, wherein said means for applying force to said media comprises a rotatable feed roll communicating with said narrow throat.

21. Rotary molding apparatus as defined in claim 20, wherein said throat is defined at least in part by a pressure wall extending generally toward said die roll; said pressure wall having a portion located directly adjacent said feed roll and closely spaced therefrom; said feed roll having media-engaging structure for urging media within said hopper toward said wall and toward said die roll under sufficient force to create a media-pressurization zone between the feed roll, the pressure wall and the die roll.

22. Rotary molding apparatus as defined in claim 21, wherein said pressure wall portion located directly adjacent said feed roll is disposed within a maximum spacing of on the order of about one inch from said die roll.

23. Rotary molding apparatus as defined in claim 22, wherein said pressure wall portion spacing is on the order of about one-half inch.

24. Rotary molding apparatus as defined in claim 21, wherein said feed roll and pressure wall are positioned laterally adjacent one another in generally horizontal opposition, and said die roll is located generally below both said feed roll and said pressure wall.

25. Rotary molding apparatus as defined in claim 24, wherein said feed roll and said die roll have relative diameter sizes and rotational drive speeds such that their relative peripheral speeds are on the order of about one to one.

26. Rotary molding apparatus as defined in claim 25, wherein said feed roll and die roll have means for independently varying the drive speed of one relative to the other.

27. Rotary molding apparatus as defined in claim 24, and including means for progressively covering said die roll cavities as they are filled with said soft media under pressurization.

28. Rotary molding apparatus as defined in claim 24, and including means for covering the die cavities in said die roll through a substantial portion of the arcuate distance travelled by such cavities as the die roll rotates from the position of said media-pressurization zone to the position where the shaped articles leave the die roll cavities.

29. Rotary molding apparatus as defined in claim 27, wherein said covering means includes a shoe member disposed contiguous to the surface of said die roll at the downstream end of the media pressurization zone, said die roll cavities passing under said shoe member by rotation of the die roll as the cavities are filled by pressurized media.

30. Rotary molding apparatus as defined in claim 29, wherein said shoe member has a leading edge configured to level off the media filling said cavities to conform to the shape and level of the surface of the die roll adjacent the cavities.

31. Rotary molding apparatus as defined in claim 30, wherein said leading edge of said shoe member is also configured to strike off excess media from the surface of the feed roll as it rotates past the media pressurization zone.

32. Rotary molding apparatus as defined in claim 24, wherein said feed roll has a plurality of elongated and generally parallel recesses in its outer surface and at least some of such recesses are of generally sawtooth cross section.

33. Rotary molding apparatus as defined in claim 24, wherein said feed roll has a plurality of generally parallel longitudinally-extending recesses in its outer surface and at least some of said recesses are disposed at an angle with respect to the longitudinal axis of said feed roll.

34. Rotary molding apparatus as defined in claim 33, wherein said angular recesses extend generally helically across the surface of said feed roll.

35. Rotary molding apparatus as defined in claim 33, wherein at least certain of said recesses are of generally sawtooth cross section.

36. Rotary molding apparatus as defined in claim 24, wherein said pressure wall terminates closely adjacent the surface of said die roll, and including media-reentry means disposed along the termination edge of said pressure wall outside said hopper and adjacent said die roll.

37. Rotary molding apparatus as defined in claim 36, wherein said media-reentry means comprises an elongated member having a surface projecting outwardly from said pressure wall to define a reentry channel between said surface and said die roll.

38. Rotary molding aparatus as defined in claim 37, wherein said reentry channel is at least slightly tapered and converges toward the surface of said wall.

39. Rotary molding apparatus as defined in claim 38, wherein said reentry member comprises a generally solid wedge-like reinforcement member.

40. In a rotary molding apparatus for producing shaped articles from baking doughs and like media, of the general type having a rotary die roll with a plurality of molding cavities in its outer surface and a longitudinal axis of rotation, a supply hopper disposed generally above said die roll axis for holding a quantity of the media to be molded, means for feeding such media from the hopper to said die roll for shaping by the said cavities thereof, and a take-off conveyor extending into complementary engagement with at least the lower extremities of said die roll for removing the shaped articles of soft media from the die roll cavities in which they are shaped and conveying the removed articles away for further processing, the improvement comprising: article-retention means disposed adjacent an arcuate segment of the surface of said die roll between said supply hopper and said take-off conveyor, for retaining the soft media in place within the individual molding cavities of said die roll during rotation of the die roll from the elevated position of the supply hopper to the said lower extremity position of the die roll where engagement with said take-off conveyor occurs.

41. The improvement in rotary molding apparatus as defined in claim 40, wherein said article-retention means includes a laterally-elongated shoe member having a curved media-retaining face disposed adjacent said die roll to arcuately cover a portion of its surface.

42. The improvement in rotary molding apparatus as defined in claim 41, wherein said shoe member includes an arcuately-shaped face disposed in sliding contact with said die roll throughout a substantial portion of said arcuate segment thereof.

43. The improvement in rotary molding apparatus as defined in claim 42, and including loading means for forcing said arcuate shoe face against the surface of said die roll under pressure.

44. The improvement in rotary molding apparatus as defined in claim 43, and including means for guiding said take-off conveyor into engagement with said die roll at a point closely adjacent the trailing end portion of said shoe member and for maintaining operative engagement between said conveyor and said die roll substantially through at least the area extending from the leading edge of the shoe member to the point where said take-off conveyor disengages from the die roll and removes the shaped articles therefrom.

45. In a rotary molding apparatus for producing shaped articles from baking doughs and like media, of the general type having a rotary die roll with a plurality of molding cavities in its outer surface and a longitudinal axis of rotation, a supply hopper disposed generally above said die roll axis for holding a quantity of the media to be molded, means for feeding such media from the hopper to said die roll for shaping by the said cavities thereof, and a take-off conveyor extending into complementary engagement with at least the lower extremities of said die roll for removing the shaped articles of soft media from the die roll cavities in which they are shaped and conveying the removed articles away for further processing, the improvement comprising: means for pressurizing the media fed from said hopper to said die roll to thereby cause the media to flow into and fill the confines of said molding cavities without leaving voids as a result of the fluid pressure imposed on said media; and media-reentry means disposed adjacent the effective junction of the die roll and the front wall of the supply hopper and extending along said front wall, for facilitating reentry into said hopper of media carried with said die roll upon rotation thereof beyond said take-off conveyor and to said junction.

46. The improvement in rotary molding apparatus as defined in claim 45, wherein said front hopper wall terminates closely adjacent the surface of said die roll, and wherein said media-reentry means comprises an elongated member disposed along the lower extremity of said front wall outside said hopper and adjacent said die roll and having a surface projecting outwardly from said front hopper wall to define a reentry channel between said projecting surface and said die roll.

47. The improvement in a rotary molding apparatus as defined in claim 46, wherein said reentry channel is at least slightly tapered and converges toward the said junction of said front wall and said die roll.

48. In a rotary molding apparatus for producing shaped articles from baking doughs and like media, of the general type having a rotary die roll with a plurality of molding cavities in its outer surface and a longitudinal axis of rotation, a supply hopper disposed generally above said die roll axis for holding a quantity of the media to be molded, means for feeding such media from the hopper to said die roll for shaping by the said cavities thereof, and a take-off conveyor extending into complementary engagement with at least the lower extremities of said die roll for removing the shaped articles of soft media from the die roll cavities in which they are shaped and conveying the removed articles away for further processing, the improvement comprising: a rotary feed roll communicating with the interior of said hopper, for pressurizing the media within the hopper in a zone adjacent the die roll surface and for filling the molding cavities by the fluid pressure of the media within such zone, said feed roll having a plurality of longitudinally-extending mutually-spaced grooves in its outer surface, said grooves being disposed at an angle with respect to the longitudinal axis of the feed roll.

49. The improvement in rotary molding apparatus as defined in claim 48, wherein said angular grooves extend generally helically around the surface of said feed roll.

50. The improvement in rotary molding apparatus as defined in claim 49, wherein said grooves commence at a point located medially of said feed roll and are disposed in opposite helical direction from said point to thereby define a V-shaped configuration of grooves.

51. The improvement in rotary molding apparatus as defined in claim 49, wherein at least certain of said grooves are of generally sawtooth cross section.

* * * * *